July 1, 1924.

B. M. W. HANSON

TOLERANCE GAUGE FOR TAPERED THREADS

Filed May 5, 1923

1,499,731

Inventor

Bengt M. W. Hanson

By W. Clay Lindsey.

Attorney

Patented July 1, 1924.

1,499,731

UNITED STATES PATENT OFFICE.

BENGT M. W. HANSON, OF HARTFORD, CONNECTICUT.

TOLERANCE GAUGE FOR TAPERED THREADS.

Application filed May 5, 1923. Serial No. 637,002.

*To all whom it may concern:*

Be it known that I, BENGT M. W. HANSON, a citizen of the United States, and a resident of Hartford, county of Hartford, State of Connecticut, have invented certain new and useful Improvements in Tolerance Gauges for Tapered Threads, of which the following is a specification.

This invention relates generally to measuring instruments and, more particularly, to thread gauges. The device of the present invention has various features of novelty and advantage susceptible of use for testing thread members, but these features find peculiar adaptation in testing tapered threads, such as standard pipe threads, wherein the diameter of the thread increases from the end of the threaded member.

One object of the invention is to provide an improved form of thread gauge for testing tapered threads to indicate whether the thread will measure between certain fixed limits of tolerance.

Another object of the invention is to provide an improved form of tolerance gauge for pipe threads in which the gauge members are interchangeable to measure various sizes of pipe threads.

Other objects and advantages of the invention will be in part obvious and in part pointed out hereinafter.

The invention accordingly consists in the features of construction, combination of elements and arrangement of parts which will be exemplified in the construction hereinafter set forth, and the scope of the application of which will be indicated in the appended claims.

In the drawing forming a part of this specification and in which there is shown, by way of illustration only and not in a limiting sense, a tolerance gauge for pipe threads embodying the features of my invention, Fig. 1 is an elevation of the gauge;

Figure 1:
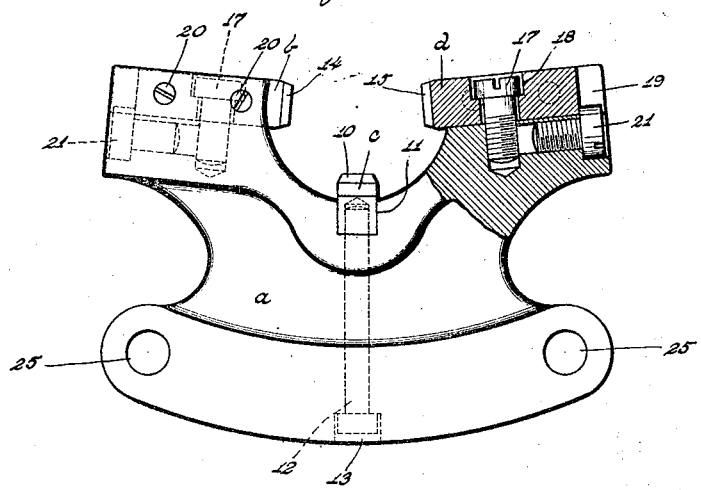

Referring to the drawing, the gauge comprises a body portion $a$ on which are mounted three gauge members $b$, $c$ and $d$ angularly spaced apart so that a properly threaded end of a pipe may be inserted therebetween, the gauge member $c$ being adapted to support the pipe between the other two gauge members $b$ and $d$, and the gauge members $b$ and $d$ being arranged to contact at opposite sides with the pipe.

The gauge member $c$ which is serrated on its contact face, as at 10, is held in a slot 11 in the body $a$ by means of a screw 12 extending through the body and threading into the gauge member $c$. The body $a$ is preferably counterbored as at 13 to receive the head of the screw 12. The gauge members $b$ and $d$ which are constructed similar to each other, except that the serrated faces 14 and 15, respectively, are oppositely inclined in accordance with the lead angle of the thread to be gauged, are fastened, preferably rigidly, to the body $a$. Screws 17, which thread into the body $a$, hold the gauge members $b$ and $d$ from being lifted from the slots 19 in the upper face of the body $a$, each of the gauge members being counterbored as at 18 to accommodate the head of the screw. The openings or bores in the members $b$ and $d$ are larger than the screws 17 so as to provide sufficient clearance for adjustment of the gauge members. Each gauge member is held tightly against one wall of the slot 19 by means of a pair of screws 20 which are threaded through the opposite wall of the slot, whereby the gauge members are held positively in position against rotation or side movement. To prevent end play of the gauge members $b$ and $d$, there are provided screws 21 which thread into the body portion $a$ just below the slot 19, and the heads of these screws are adapted to engage the ends of the gauge members $b$ and $d$. Thus, when the screws 17, 20 and 21 are all fastened tight, the gauge members are positively held rigid, there being no opportunity for sidewise, endwise, or up and down motion.

One of the gauge members, such as $d$, is provided with graduations, as at 22, 23 and 24, by means of which the tolerance in the pipe being tested may be indicated. For instance, if the end of a pipe, which has been accurately threaded, be placed between the serrated faces 14 and 15, which converge toward the end at which the graduations 22, 23 and 24 are located in accordance with the taper of the thread to be gauged, the thread on the pipe will fit snugly when the end thread lies opposite the graduation 23. If the thread is of smaller diameter, then the pipe may be screwed into the gauge till the end thread will lie beyond the graduation 23. If it does not extend beyond the graduation 24, then the thread is acceptable, but if it extends beyond that point it is too small. If the thread is slightly larger than the desired diameter, it will be impossible to screw the threaded pipe up to the graduation 23. In this case, if the thread can be screwed up to the graduation 22, it is within the permitted tolerance, but if not it is too large for the purposes at hand. In other words, the end of the pipe when screwed into the gauge must be within the graduations 22 and 24 to be within the prescribed tolerance.

Referring to Fig. 1, it will be seen that the gauge members $b$ and $d$ do not lie generally in the same plane so as to contact exactly with diametrically opposite points on the pipe inserted therebetween, but such points of contact are so disposed that slightly more than half the pipe will be within the gauge. Thus, when the pipe is screwed well into the gauge, it is held against removal at the three points of contact on the serrated faces 10, 14 and 15; the two gauge members $b$ and $d$ hold the pipe against the rest or gauge member $c$, and herefore the pipe is held or wedged against movement in all directions.

Figure 3:
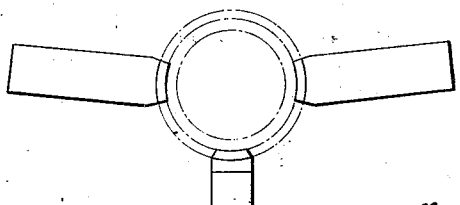
Fig. 3 is a detail view showing the jaw faces curved.

If desired, the serrated faces 14 and 15 of the gauge members $b$ and $d$, respectively, may be curved to the curvature of the pipe thread being measured as shown in Fig. 3.

Figure 2:
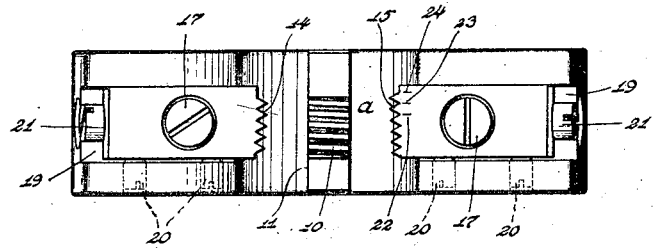
Fig. 2 is a plan view.

By the arrangement above described, threaded pipes may be very quickly gauged. Because of the very flat angle at which the gauge members $b$ and $d$ are disposed to one another, the threaded end of a pipe may be inserted into the gauge from the top (Fig. 2) at a turn or two ahead of its final position when screwed tightly into the gauge. This provides a very much more convenient arrangement than the ordinary ring gauge which has been used for testing pipe threads, since it is not necessary to screw the pipe the entire length of the gauge. By reason of the speed with which pipe thread measurements may be made, this form of gauge is found to be very economical and convenient.

As before described, the gauge members $b$ and $d$ are each slidable slightly toward and away from each other on account of the slightly larger bore of the hole through which the screw 17 passes. This provides for a slight amount of adjustment so that a threaded pipe inserted between the gauge members will be centered exactly above the center line of the gauge member $c$.

It is noted that, since the gauge members $b$, $c$ and $d$ are removable from the body portion $a$, they may be replaced by others adapted to measure smaller or larger diameter pipe threads.

The gauge may be fastened rigidly onto a bench or other supporting means by suitable bolts, there being provided bolt holes 25 in the body $a$ for such purpose.

Thus, by the above construction, are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a gauge, a body, a rest thereon, and a pair of gauge members, one on either side of and spaced from said rest member and provided with converging serrated faces to receive a tapered thread.

2. In a gauge, a body, a rest thereon, and a pair of gauge members, one on either side of and spaced from said rest member and having converging serrated faces to receive a tapered thread, one of said serrated faces being graduated to indicate tolerance limits.

3. In a gauge, a body, a rest thereon, and a pair of gauge members, one on either side of and spaced from said rest member, said gauge members having converging serrated contact faces to receive a tapered thread and means to hold said gauge members against movement in all directions.

4. In a gauge, a body portion having a recess and a pair of grooved faces radiating from said recess at opposite sides thereof, a gauge member in the groove of each of said faces, screws for holding said gauge members against the bottoms of said grooves, screws for holding said members securely against side movement in said grooves, and screws threaded into said body portion and having their heads engaging the outer ends of said members for adjusting the same and holding them in adjusted position.

5. In a gauge, a body, a rest thereon, and a pair of gauge members one on either side of and spaced more than 90° from said rest member, said gauge members having serrated gauge faces.

6. In a gauge, a body, a rest thereon, and a pair of gauge members, one on either side and spaced from said rest member and provided with serrations inclined to a plane to which the axis of a threaded member positioned between said gauge members is perpendicular so as to correspond with the thread of the member being gauged.

7. In a gauge, a body, a rest thereon, a pair of gauge members, one on either side of and spaced from said rest member, and adjusting means for said gauge members to center them with respect to said rest comprising screws holding said gauge members to said body and screws arranged to hold said gauge members against longitudinal movement.

8. In a gauge, a body, a rest thereon, a pair of gauge members, one on either side of and spaced from said rest member, screws holding said gauge members to said body, screws holding said gauge members against longitudinal movement, and means to hold said gauge members against rotation.

BENGT M. W. HANSON.